United States Patent Office 3,326,871
Patented June 20, 1967

3,326,871
CATALYTIC CONVERSION AND CATALYSTS
John W. Shepard, Griffith, Ind., and Omar O. Juveland, South Holland, and Edwin F. Peters, Lansing, Ill., assignors to Standard Oil Company, Chicago, Ill., a corporation of Indiana
No Drawing. Filed Aug. 27, 1962, Ser. No. 219,759
15 Claims. (Cl. 260—88.2)

This invention relates to the polymerization of terminal vinyl olefins to produce normally solid olefin polymers, and more particularly is concerned with providing an extremely active catalyst or catalyst component for such polymerization. The invention specifically relates to improved polymerization catalysts, to methods of making such catalysts, and to polymerization processes employing such catalysts.

Solid homopolymers and copolymers of terminal vinyl olefins such as ethylene or propylene are in wide use and have, by reason of their exceptional chemical and physical properties, found general acceptance as structural plastics and as films and fibers. Aside from the older free-radical-catalyzed, or high pressure, polymerization processes, most of these polymers are manufactured through the use of ionic catalysts. There has now been discovered, according to the invention, an improved ionic catalyst which provides exceptionally favorable product quality and affords unusually high reaction rates.

Briefly, according to the invention, a polymerization catalyst comprising a minor amount of a transition heavy metal oxide of Group 4 of the Periodic Table (i.e., titania, zirconia, hafnia, or thoria) extended on a high surface area support selected from the group silica, alumina, and silica alumina, is greatly enhanced in its activity by treatment with a hydrogen halide in the vapor phase prior to use. The hydrogen halide is HCl, HBr, HI and HF, singly or in combination, and is employed in the gas phase at a temperature advantageously within the range of about 20 to 700° C. It has been found that such activation of the catalyst may be effected at any stage of is preparation; where the catalyst is calcined in an oxygen-containing gas and thereafter reduced with a reducing gas such as hydrogen for oxide valence control, the inventive treatment may be applied before oxidation, between oxidation and reduction, or during or after reduction.

The catalyst of the invention may be employed as the sole component of a polymerization catalyst, or may be used in a cocatalyst system with promoters or activators which are generally known to the art. For example, various elements, hydrides, and organo-metallic compounds of non-transition metals and non-metals in Groups 1, 2, or 3 of the Periodic Table (as will appear more fully hereinafter) are known as Group 4 metal oxide catalyst promoters, and these may similarly be employed as heretofore.

The catalyst with which the present invention is concerned consists of or comprises a minor amount of one or more transition heavy metals from Group 4 of the Periodic Table in the form of an oxide extended on a high surface area support. Generally speaking, the transition heavy metals of the foregoing group are catalytically most effective in a form wherein at least a portion of the transition heavy metal oxide is in a sub-maximum valence state. For example, titania is most effective when its average valence is less than 4, etc. The transition heavy metal oxide content is usually in a weight ratio to support of about 1:20 to about 1:1, or approximately 1:10. Ordinarily, the transition heavy metal oxide is present at from about 5 to about 35 weight percent of the total solid polymerization catalyst, i.e., transition heavy metal oxide plus support.

The high surface area support is natural or synthetic (preferably gamma or eta), silica, or silica-alumina. These usually have surface areas (BET low temperature nitrogen adsorption isotherm method) in excess of 100 square meters per gram of support, and are incapable of reduction with hydrogen at 1000° C. The transition metal oxide and support may be prepared by any technique, e.g., impregnation, cogellation, coprecipitation, etc.

While most if not all of the Group 4 metal oxide catalysts are effective for polymerizing terminal vinyl olefin monomers to normally solid polymers when used alone, they are generally promoted with one or more "promoters," "activators," or "cocatalysts." These materials are generally the elements, hydrides, and organo-metallic compounds (metal attached to a carbon atom) of non-transition metals and non-metals of Groups 1, 2, and 3 of the Mendelyeef Periodic Table. Groups 1, 2, and 3 include Li, Na, K, Rb, Cs, Be, Mg, Ca, Sr, Ba, B, Al, etc. Illustrative promoters for Group 4 metal oxides are: aluminum alkyls and sesquihalides such as aluminum triethyl and aluminum diethyl chloride, alkali metals such as sodium or lithium, alkali metal hydrides such as sodium hydride, akaline earth metals such as calcium, alkaline earth metal hydrides such as butyl lithium, metal borohydrides and aluminohydrides such as sodium borohydride, and alkaline earth metal carbides such as calcium carbide. Hydrocarbon aluminum compounds such as $Al(i-Bu)_3$ and $AlCl_2Et$, in which an aluminum atom is connected to one or more hydrocarbon radicals, are outstanding promoters. The promoters, or "cocatalysts" as they will hereinafter be termed, perform the multiple functions of reducing and thereby activating fresh catalyst, reactivating spent catalyst, scavenging impurities such as water, sulfur compounds, and carbon dioxide, and, lastly, they enter directly into the polymerization catalysis.

Terminal vinyl olefin monomers which may be polymerized with the aforementioned catalyst system to obtain a normally solid polymer are monoolefins and diolefins having the formula $RHC:CH_2$, where R is hydrogen or an alkyl, alkenyl, or aryl group, or combinations of such groups. Preferred feedstocks are the terminal vinyl olefins containing from two to eight carbon atoms inclusive, per molecule, and those which contain two to four carbon atoms inclusive are most commercially attractive now. Suitable feedstocks comprise ethylene, propylene, 1-butene, 1-pentene, 1-heptene, 1-octene, 1-dodecene, 1-tetradecene, 1-hexadecene or their mixtures or the like. Examples of isoalkyl ethylenes which can be used as components of polymerization feedstocks are 3-methylbutene, 4-methylpentene, 5-methylhexene or their mixtures with each other or with normal 1-alkenes, or the like. Aryl olefins may also be used, and are exemplified by styrene, alpha-methyl styrene, etc. Suitable diolefins include butadiene, piperylene, isoprene, etc.

The alkene monomers can be co-polymerized with suitable polymerizable comonomers, for example aryl ethylenes such as styrene, ar-halostyrenes, ar-alkylstyrenes or the like. Other suitable comonomers comprise conjugated dienes such as butadiene, isoprene, chloroprene, piperylene, cyclopentadiene or the like. Other comonomers include tetrafluoroethylene, perfluorovinyl chloride or the like.

Miscellaneous alkene charging stocks which can be polymerized by the process of the invention include norbornylene, 4-vinyl-cyclohexene, vinyl cyclohexene or the like.

In general, the present process would appear to find its greatest current utility in the conversion of normally gaseous 1-alkenes, alone or with suitable comonomers, to form normally solid waxy or tough resinous materials suitable for use as commercial plastics, as in the conversion of ethylene to resinous polyethylenes; ethylene-propylene mixtures to form resinous copolymers having densities (ASTM D1505-57T) within the range of about 0.92 to 0.97 gram per cc.; propylene to form normally solid, resinous polypropylenes containing both amorphous and crystalline components; 1-butene to form waxy-to-resinous polymers; ethylene-1-butene mixtures to form normally solid copolymers and the like. Copolymers prepared from ethylene and a minor amount of other alpha olefins such as propylene or butene-1 may be relatively stiff, resembling polyethylene in appearance and properties. Copolymers of ethylene with a major amount of alpha olefins, advantageously with small amounts of diolefins, are amorphous rubbery materials.

The olefin charging stock may contain unreactive diluents such as saturated hydrocarbons of similar or identical boiling range, for example, as in alkenes or their mixtures derived from petroleum refining operations. Water, oxygenated compounds such as carbonyls, oxygen, etc., are best eliminated from the feed by prior treatment, as for example with 4 Angstrom molecular sieve, silica gel, etc. The charging stock is polymerized in contact with a liquid phase. This liquid may comprise liquid charging stock alone or charging stock in solution in a substantially inert liquid reaction medium in a concentration in the range of about 1 to about 25 percent by weight of the total solution. Higher concentration, e.g. up to 100 percent, may if desired be employed, as for example in the polymerization of propylene where no inert liquid need be present.

A substantially inert liquid reaction medium is desirably employed during the polymerization. This liquid is preferably a normally liquid saturated aliphatic or aromatic hydrocarbon but can be a relatively unreactive alkene (containing a non-terminal double bond) or in some instances, a cycloalkene, a perfluorocarbon, a chloroaromatic or mixtures of suitable liquids as the case may be. By "substantially inert liquid reaction medium," reference is made to liquids which remain liquid under polymerization conditions and which do not substantially interfere with the reaction or deleteriously affect the resultant polymer.

Polymerization conditions include a temperature within the range of about −10° C. to about 300° C., the preferred conditions being largely dependent upon the particular catalyst employed. Group 4 metal oxide catalysts are best used at temperatures of from about 0° C. to about 300° C. When polymerization is effected at relatively low temperatures, e.g. −10 to about 100° C., and preferably from +50 to +95° C., the highly crystalline polymers which form appear as solids which are substantially insoluble in the reaction mixture. When polymerization is effected at relatively high temperatures, e.g. 125–300° C., and particularly but not exclusively when the liquid reaction medium comprises an aromatic hydrocarbon, most polymers are in the reaction mixture as liquids or gels which are miscible with or soluble in the liquid reaction medium. This is termed "solution polymerization."

The concentrations of catalyst and of any cocatalyst are not critical. The proportion of catalyst (Group 4 metal oxide plus support) based on the weight of olefin feedstock can range from 0.1 weight percent to 20 weight percent or even more. The cocatalyst may illustratively be present in a molar ratio of from 100:1 to 1:1 on the transition metal oxide catalyst.

As indicated earlier, the inventive treatment with vapor form hydrogen halide may be employed at any stage of the catalyst manufacturing operation. It is frequently advisable to control the oxidation state of the transition heavy metal oxide by suitable calcination followed by reduction, and if both of these procedures are employed the hydrogen halide treatment is suitable either prior to calcination, between calcination and reduction, or after reduction. Hydrogen halide treatment is advantageously conducted at a temperature within the range of about 20 to 700° C., preferably about 150–550° C., and optimally about 400–600° C. The treatment time may range from as little as 0.01 hour (at high hydrogen halide concentrations and high temperatures) to as much as 20 hours or more (at lower temperatures and lower hydrogen halide concentrations). A practical range is about 0.25–4.0 hours.

The hydrogen halide treating agent may be employed in any concentration and at any pressure. Thus the concentration may range from as little as 0.5 per cent to 100 percent hydrogen halide, the balance being preferably a gas which is neither oxidizing nor reducing; nitrogen or the rare gases such as argon or helium are optimum in this respect. A moving stream of gas appears to be preferable, as it carries away any volatile transition metal halides or oxy-halides.

The hydrogen halides are hydrogen chloride, hydrogen bromide, hydrogen iodide, and hydrogen fluoride, singly or in combination. Hydrogen fluoride is known to react with alumina as well as most of the transistion heavy metal oxides to form volatile compounds which are carried out of the treating zone in the gas phase.

The hydrogen halide treating agent and the inert gas diluent, if any, appear to be most effective when employed in the absence of any moisture, although this is not a mandatory requirement. Treatment at atmospheric pressure is most convenient, although the treating temperature may range from as little as 0.01 atmosphere hydrogen halide partial pressure to as much as 10 atmospheres or more. Included within the scope of the invention are substances which are capable of producing hydrogen halide by reaction on the catalyst, e.g. fluorophosphoric acid, fluorosulfonic acid, chlorosulfonic acid, etc.

Where the catalyst is oxidized, either before or after the inventive hydrogen halide treatment, oxidation conditions may range from about 300 to 600° C., preferably about 400–550° C., e.g. 450–525° C., for a period ranging from about 0.01 to 20 hours or more, optimally about 1–2 hours. The oxygen partial pressure may range from as little as 0.01 atmosphere to 10 atmospheres or more, with either pure oxygen or diluted oxygen being suitable. Calcination in air at atmospheric pressure is both convenient and effective.

Reduction of a calcined catalyst to a transition heavy metal oxide, at least a portion of which is in a submaximum valence state, may be effected with any reducing gas, e.g. hydrogen, CO, $SO_2$, or a hydrocarbon, at temperatures within the range of about 300–600° C., preferably about 400–500° C., for a time ranging from about 0.01 to about 20 hours, e.g. 0.25–1.0 hour. Under some circumstances a gaseous reducing agent may be unnecessary, as where a catalyst is first mixed with a portion of the olefin feed, a cocatalyst which is a strong reducing agent is added (e.g. aluminum alkyl), and the mixture then heated to polymerization temperature. The time, temperature, and nature of either gaseous or liquid reducing agent are correlated to afford the desirable average valence state of the transition metal oxide component, and this is readily determined by simple experimentation.

As stated earlier, the inventive hydrogen halide treatment may be employed either before oxidation, after oxidation and before reduction, or after oxidation and reduction. In the event that either oxidation or reduction, or both, is not employed, the hydrogen halide treatment may be effected at any time. While the theory underlying such treatment is not clear, it appears that hydrogen halide reacts in some manner with the transition heavy metal compound so as to deposit a substantial amount of halide on the catalyst, e.g. 0.1 percent by weight up to about 6 percent by weight. At the same time, a portion of the transition heavy metal oxide is apparently volatilized off, presumably in the form of a halide or oxyhalide, and this amount may range from about 0.01 percent (on the total catalyst) to about 5 percent or so. As a result, the number of active sites on the catalyst is increased. The removal of hydrogen halide from a treating gas stream, or correspondingly the presence of volatile transition metal compounds in the effluent gas, can be taken as measures of progress of the inventive treatment.

Catalyst treated as above may be employed directly in a polymerization reaction, suitably after comminution to particle size ranging from about 60 to about 200 mesh. It is desirable to exclude oxygen from the treated catalyst, as is conventional with other ionic polymerization catalysts.

Various aspects of the invention are illustrated in the ensuing working and illustrative examples. It is to be understood that these are for demonstration purposes only, and are not intended to be wholly definitive or exclusive with respect to scope or conditions.

POLYMERIZATION PROCEDURE

For an ethylene polymerization, dry deoxygenated decarboxylated "odorless mineral spirits" (sulfuric acid treated naphtha consisting essentially of alkanes, boiling range 168–190° C.), catalyst, and promoter (if any) are charged to a 1-liter stirred stainless steel autoclave under an argon or nitrogen gas blanket. The reactor is sealed and heated to reaction temperature. Polymerization grade ethylene is then introduced.

Essentially the same procedure is followed for propylene homopolymerization. For ethylene-propylene copolymers two feeds are used; the initial feed consisting of a mixture of comonomers, and the sustaining feed of straight ethylene. The initial feed governs co-polymer composition, while the sustaining feed replenishes the more reactive ethylene.

Example I

This example illustrates the invention as applied to ethylene polymerization with a sodium-metal promoted titania-on-alumina catalyst. The activating agent is HCl.

The catalyst is a nominal 12 percent $TiO_2$, impregnated on alumina. Before use it is calcined in a stream of oxygen in a rotary furnace at 500° C. for 1 hour at atmospheric pressure, and then reduced to a valence state of less than 4 with a hydrogen gas stream at 500–550° C. for 2.3 hours. Activation is employed during reduction.

Activation consists in passing a stream of about 25 percent anhydrous hydrogen halide in the hydrogen over the catalyst continuously during reduction so as to achieve a desired halogen content on the final catalyst. For comparison purposes, an identical catalyst is treated in the exact manner described above, except that no HCl is used. In both instances the catalyst changes from white to blue upon reduction.

Reaction conditions for the polymerization are: 1,000 p.s.i.g. ethylene pressure, 280° C., 400 ml. odorless mineral spirits, 0.2 g. dispersed sodium promoter, and 2.0 g. catalyst.

The following results are observed.

TABLE I.—ETHYLENE POLYMERIZATION

| | Run No. | |
|---|---|---|
| | 1 | 2 |
| Ativation: Agent | None | HCl |
| Ccatalyst Inspections: | | |
| $TiO_2$, Wt. Percent | 12.85 | 12.06 |
| Halogen, Wt. Percent | 0 | 2.50 |
| Polymerization Yields: | | |
| Ethylene Uptake, g | 7 | 35 |
| Polymer Yield, g | 2.5 | 14 |
| Polymerization Rate, g./g./hr | 0.6 | 3.5 |
| Rate Factor | 1.0 | 5.6 |
| Polymer Inspections: | | |
| Intr. Viscosity (ASTM D1601–59T) | 1.73 | 3.12 |
| Melt Index (ASTM D1238–57T) | (*) | 0.08 |
| Annealed Density (ASTM D1505–57T) | (*) | 0.964 |

*Insufficient product for measurement.

Example II

Polymerizations conducted in the manner of Example I but under the following conditions illustrate further embodiments of the invention.

TABLE II

| | Run No. | | | | |
|---|---|---|---|---|---|
| | 3 | 4 | 5 | 6 | 7 |
| Monomer | Ethylene | Ethylene | Ethylene | Ethylene | (1) |
| Catalyst: | | | | | |
| Metal Oxide | $TiO_2$ | $ZrO_2$ | $HfO_2$ | $ThO^2$ | $TiO_2$ |
| Wt. Percent | 12 | 12 | 12 | 12 | 12 |
| Support | $SiO_2$ | $SiO_2$-$Al_2O_3$ | $SiO_2$ | $Al_2O_3$ | $Al_2O_3$ |
| Promoter | Al(i-Bu)$_3$ | LiH | LiBu | K | Na |
| Activation: | | | | | |
| Agent | HCl | HBr | HI | HCl | HF |
| Used Before/During/After Reduction | No. Red. | Before | During | After | Before |
| Activation Temp., ° C | 500–550 | 500–550 | 500–550 | 500–550 | 300 |
| Activation Time, Hrs | 2.3 | 2.3 | 2.3 | 2.3 | 0.25 |
| Polymerization Conditions: | | | | | |
| Catalyst, g | 0.67 | 0.67 | 0.67 | 0.67 | 0.67 |
| Mol. Promoter/Mol. Metal. Oxide | 40 | 40 | 40 | | 24 |
| Temperature, ° C | 200 | 280 | 200 | 280 | 280 |
| Pressure | 1,000 | 1,000 | 1,000 | 1,000 | 750 |
| Time, Hrs | 2 | 2 | 2 | 2 | 2 |

1 Ethylene, 20% Propylene.

Upon completion of a polymerization, the hot polymer solution is filtered through a cellulosic medium under pressure to remove catalyst and promoter, and the filtrate cooled to room temperature to precipitate the polymer. The polymer is washed in hexane to remove the spirits and then vacuum-oven dried to constant weight.

Thus it is apparent that catalysts activated pursuant to the invention possess substantially enhanced activity in comparison with prior art catalysts. Frequently the improvement in polymerization rate is by a factor of from 4 to 5 or even higher. Thus it is evident that the invention provides a markedly improved olefin polymerization catalyst.

While the invention has been described in conjunction with specific examples thereof, it is to be understood that these are for illustrative purposes only. Accordingly, many alternatives, modifications, and variations will be apparent to those skilled in the art in light of the foregoing description, and it is intended to embrace all such alternatives, modifications, and variations as fall within the spirit and broad scope of the appended claims.

We claim:

1. A method of preparing a catalyst suitable for polymerizing terminal vinyl olefins of the type having a minor amount of a transition heavy metal oxide selected from oxides of metals in Group 4 of the Periodic Table extended on a high surface area support selected from the group consisting of silica, alumina, and silica-alumina, the step whereby a catalyst of improved activity is obtained which comprises: contacting said catalyst with a hydrogen halide in the vapor phase prior to use.

2. Method of claim 1 wherein said heavy metal is titanium.

3. Method of claim 1 wherein said hydrogen halide is hydrogen chloride.

4. Method of claim 1 wherein said catalyst is contacted with hydrogen halide at a temperature within the range of about 20–700° C. and for a time within the range of about 0.01–20 hours.

5. Method of claim 1 wherein said contact is effected after oxidation and during reduction of said catalyst.

6. A process for polymerizing terminal vinyl olefins to obtain normally solid polymers which comprises contacting such monomers under suitable polymerization conditions with a catalyst prepared according to the method of claim 1.

7. A process for polymerizing terminal vinyl olefins to obtain normally solid polymers, which comprises contacting such monomers under suitable polymerization conditions with a catalyst prepared according to the method of claim 2.

8. A process for polymerizing terminal vinyl olefins to obtain normally solid polymers, which comprises contacting such monomers under suitable polymerization conditions with a catalyst prepared according to the method of claim 3.

9. A process for polymerizing terminal vinyl olefins to obtain normally solid polymers, which comprises contacting such monomers under suitable polymerization conditions with a catalyst prepared according to the method of claim 4.

10. A process for polymerizing terminal vinyl olefins to obtain normally solid polymers, which comprises contacting such monomers under suitable polymerization conditions with a catalyst prepared according to the method of claim 5.

11. An olefin polymerization catalyst prepared by the method of claim 1.

12. An olefin polymerization catalyst prepared by the method of claim 2.

13. An olefin polymerization catalyst prepared by the method of claim 3.

14. An olefin polymerization catalyst prepared by the method of claim 4.

15. An olefin polymerization catalyst prepared by the method of claim 5.

References Cited

UNITED STATES PATENTS

| | | | |
|---|---|---|---|
| 2,725,374 | 11/1955 | Mosher | 260—94.9 |
| 2,727,868 | 12/1955 | Simpson | 252—429 |
| 2,773,841 | 12/1956 | Kimberlin et al. | 252—429 |
| 2,891,044 | 6/1959 | Matlack | 260—94.9 |
| 2,912,421 | 11/1959 | Juveland | 260—94.9 |
| 2,913,442 | 11/1959 | Matlack | 260—93.7 |
| 2,914,517 | 11/1959 | Schmerling | 260—93.7 |
| 3,006,909 | 10/1961 | Witt | 260—94.9 |
| 3,007,905 | 11/1961 | Bailey | 260—94.9 |
| 3,010,948 | 11/1961 | Field | 260—94.9 |
| 3,017,402 | 1/1962 | Engel | 260—94.9 |
| 3,050,514 | 8/1962 | Cawthon et al. | 260—94.9 |
| 3,105,066 | 9/1963 | MacKenzie | 260—94.9 |

JOSEPH L. SCHOFER, *Primary Examiner.*

M. LIEBMAN, *Examiner.*

F. L. DENSON, F. M. SIKORA, *Assistant Examiners.*